(12) United States Patent
Nieh

(10) Patent No.: US 10,880,106 B1
(45) Date of Patent: Dec. 29, 2020

(54) ACTIVE POWER OVER ETHERNET CONTROL APPARATUS WITH LOW POWER CONSUMPTION

(71) Applicant: ELEMENTECH INTERNATIONAL CO., LTD., Taipei (TW)

(72) Inventor: Ming-Han Nieh, Taipei (TW)

(73) Assignee: ELEMENTECH INTERNATIONAL CO., LTD., Taipei (TW)

( * ) Notice: Subject to any disclaimer, the term of this patent is extended or adjusted under 35 U.S.C. 154(b) by 0 days.

(21) Appl. No.: 16/459,085

(22) Filed: Jul. 1, 2019

(51) Int. Cl.
| H04L 12/10 | (2006.01) |
| H02M 1/088 | (2006.01) |
| H02M 3/155 | (2006.01) |
| H02M 1/00  | (2006.01) |

(52) U.S. Cl.
CPC ............ *H04L 12/10* (2013.01); *H02M 1/088* (2013.01); *H02M 3/155* (2013.01); *H02M 2001/0048* (2013.01)

(58) Field of Classification Search
CPC .. H04L 12/10; H04L 12/40045; H02M 1/088; H02M 3/155; G06F 1/26
See application file for complete search history.

(56) References Cited

U.S. PATENT DOCUMENTS

| 9,377,794 | B1* | 6/2016 | Dwelley | H04L 41/0681 |
| 2013/0111245 | A1* | 5/2013 | Giat | H04L 12/4625 |
| | | | | 713/323 |
| 2015/0091391 | A1* | 4/2015 | Dwelley | H02J 3/00 |
| | | | | 307/130 |
| 2016/0127135 | A1* | 5/2016 | Balasubramanian | ........... |
| | | | | H04L 12/40045 |
| | | | | 713/300 |
| 2016/0197734 | A1* | 7/2016 | Darshan | G06F 1/266 |
| | | | | 307/1 |
| 2017/0118030 | A1* | 4/2017 | Love | G06F 1/266 |
| 2019/0068385 | A1* | 2/2019 | Gardner | H02J 1/06 |
| 2019/0190727 | A1* | 6/2019 | LaBosco | G06F 1/28 |
| 2019/0386836 | A1* | 12/2019 | Gong | G06F 1/266 |
| 2020/0304106 | A1* | 9/2020 | Gardner | H03H 11/50 |

* cited by examiner

*Primary Examiner* — Aristocratis Fotakis
(74) *Attorney, Agent, or Firm* — Muncy, Geissler, Olds & Lowe, P.C.

(57) ABSTRACT

An active power over Ethernet control apparatus with low power consumption includes a control unit and a low-power-consumption control circuit. The control unit is installed inside a power sourcing equipment. The low-power-consumption control circuit includes a detecting circuit, a handshaking circuit, and a self-holding circuit. The detecting circuit provides a first control signal. The handshaking circuit receives the first control signal and provides a second control signal. The self-holding circuit receives the second control signal. When a powered device is not connected to the power sourcing equipment, a power-supplying path from the power sourcing equipment to the powered device is disconnected. When the powered device is connected to the power sourcing equipment, the handshaking circuit is controlled by the first control signal and the self-holding circuit is controlled by the second control signal to make the power-supplying path be connected.

9 Claims, 4 Drawing Sheets

ACTIVE POWER OVER ETHERNET CONTROL APPARATUS WITH LOW POWER CONSUMPTION

BACKGROUND

Technical Field

The present disclosure relates to an active power over Ethernet control apparatus, and more particularly to an active power over Ethernet control apparatus with low power consumption.

Description of Related Art

The statements in this section merely provide background information related to the present disclosure and do not necessarily constitute prior art.

Power over Ethernet (PoE) is a technology that can transmit power and data to a device through a twisted pair in an Ethernet network. All devices such as voice over IP (VoIP), wireless base stations, network cameras, hubs, and computers can be powered by the PoE technology. Since the electronic devices can be powered through the Ethernet network in the PoE without additional power outlet, the time and cost of configuring power wires can be eliminated, so that the cost of the entire device system can be relatively reduced.

In general, a PoE device can be divided into two parts, one of which is a power sourcing equipment (PSE) at a power sourcing side, and the other of which is a powered device (PD) at a powered side. In addition, depending on whether the power supply is actively detected, the PoE can be classified into an active PoE and a passive PoE. The active PoE means that the PoE can actively detect power supply. In other words, the PSE will first detect whether the connected device needs to be supplied power and then decide to provide power or not. In contrast, since the passive PoE cannot actively detect power supply, the PSE must provide power regardless of whether the connected device requires power.

However, the internal circuit components (especially the switching components) consume a large amount of energy under a no-load condition since the active PoE actively detects power supply, and therefore it fails to meet the Level VI Energy Efficiency Requirements for U.S. DoE (Department of Energy).

SUMMARY

An object of the present disclosure is to provide an active power over Ethernet control apparatus with low power consumption to solve a problem that the active PoE under a no-load condition fails to meet the Level VI Energy Efficiency Requirements for U.S. DoE.

In order to achieve the object, the active power over Ethernet control apparatus with low power consumption includes a control unit and a low-power-consumption control circuit. The control unit is installed inside a power sourcing equipment. The low-power-consumption control circuit includes a detecting circuit, a handshaking circuit, and a self-holding circuit. The detecting circuit provides a first control signal. The handshaking circuit is coupled to the detecting circuit and receives the first control signal and provides a second control signal. The self-holding circuit is coupled to the handshaking circuit and receives the second control signal. When a powered device is not connected to the power sourcing equipment, a power-supplying path from the power sourcing equipment to the powered device is disconnected. When the powered device is connected to the power sourcing equipment, the handshaking circuit is controlled by the first control signal and the self-holding circuit is controlled by the second control signal to make the power-supplying path be connected.

In one embodiment, the detecting circuit includes a voltage-divided resistor network and a first power switch. The first power switch is coupled to the voltage-divided resistor network. When the powered device is not connected to the power sourcing equipment, the first power switch is turned off to make the detecting circuit provide the first control signal with a high level, when the powered device is initially connected to the power sourcing equipment, the voltage-divided resistor network is configured to provide a voltage at which the first power switch is turned on so that the detecting circuit provide the first control signal with a low level.

In one embodiment, the handshaking circuit includes a monostable trigger. The monostable trigger receives the first control signal. The monostable trigger includes a resistor-capacitor network, a second power switch, and a third power switch. The second power switch and the third power switch are coupled to the resistor-capacitor network. When the powered device is connected to the power sourcing equipment, the monostable trigger is controlled by the first control signal to make the handshaking circuit provide the second control signal with a high level.

In one embodiment, a duration time of the second control signal with the high level is determined by the resistor-capacitor network.

In one embodiment, the self-holding circuit includes a first diode, a second diode, a fourth power switch, a fifth power switch, and a sixth power switch. The second diode is coupled to the first diode. The fourth power switch is coupled to the first diode and the second diode. The fifth power switch is coupled to the first diode and the second diode. The sixth power switch is coupled to the second diode. When the powered device is connected to the power sourcing equipment, the first diode is turned on by the second control signal with the high level, and the fourth power switch, the fifth power switch, and the sixth power switch are turned on.

In one embodiment, a handshaking communication is performed between the powered device and the power sourcing equipment within the duration time of the second control signal with the high level.

In one embodiment, when the handshaking communication between the powered device and the power sourcing equipment is successful, the control unit produces a detection signal with a low level to turn off the sixth power switch and turn on the second diode, the fourth power switch, and the fifth power switch.

In one embodiment, when the powered device is disconnected to the power sourcing equipment, the control unit produces the detection signal with a high level to turn off the second diode, the fourth power switch, and the fifth power switch.

In one embodiment, each of the power switches is an n-MOSFET.

In one embodiment, an energy consumption of the power sourcing equipment in a no-load condition is less than or equal to 100 milliwatts.

Accordingly, the active power over Ethernet control apparatus with low power consumption can meet the Level VI Energy Efficiency Requirements for U.S. DoE, that is, the no-load mode power is less than or equal to 100 milliwatts.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
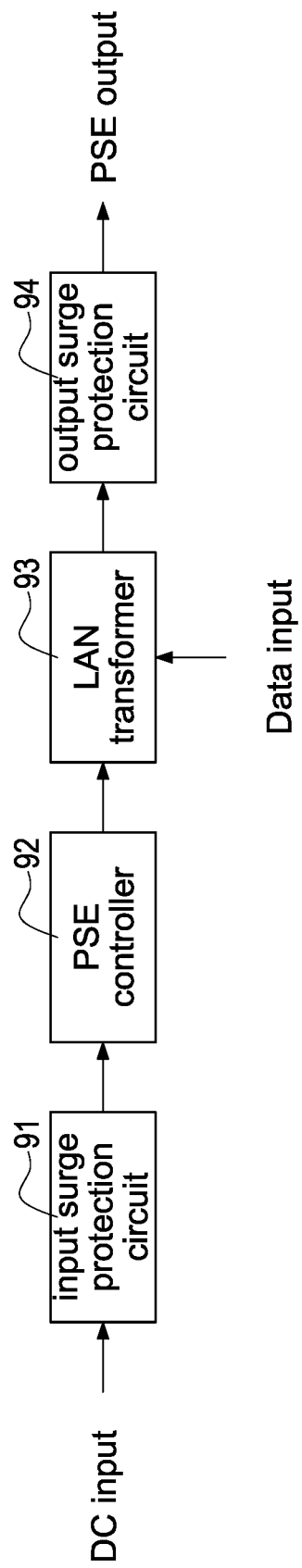
FIG. 1 is a schematic block diagram of a power sourcing equipment without a low-power-consumption control circuit according to the present disclosure.

Reference will now be made to the drawing figures to describe the present disclosure in detail. It will be understood that the drawing figures and exemplified embodiments of present disclosure are not limited to the details thereof.

Figure 3:
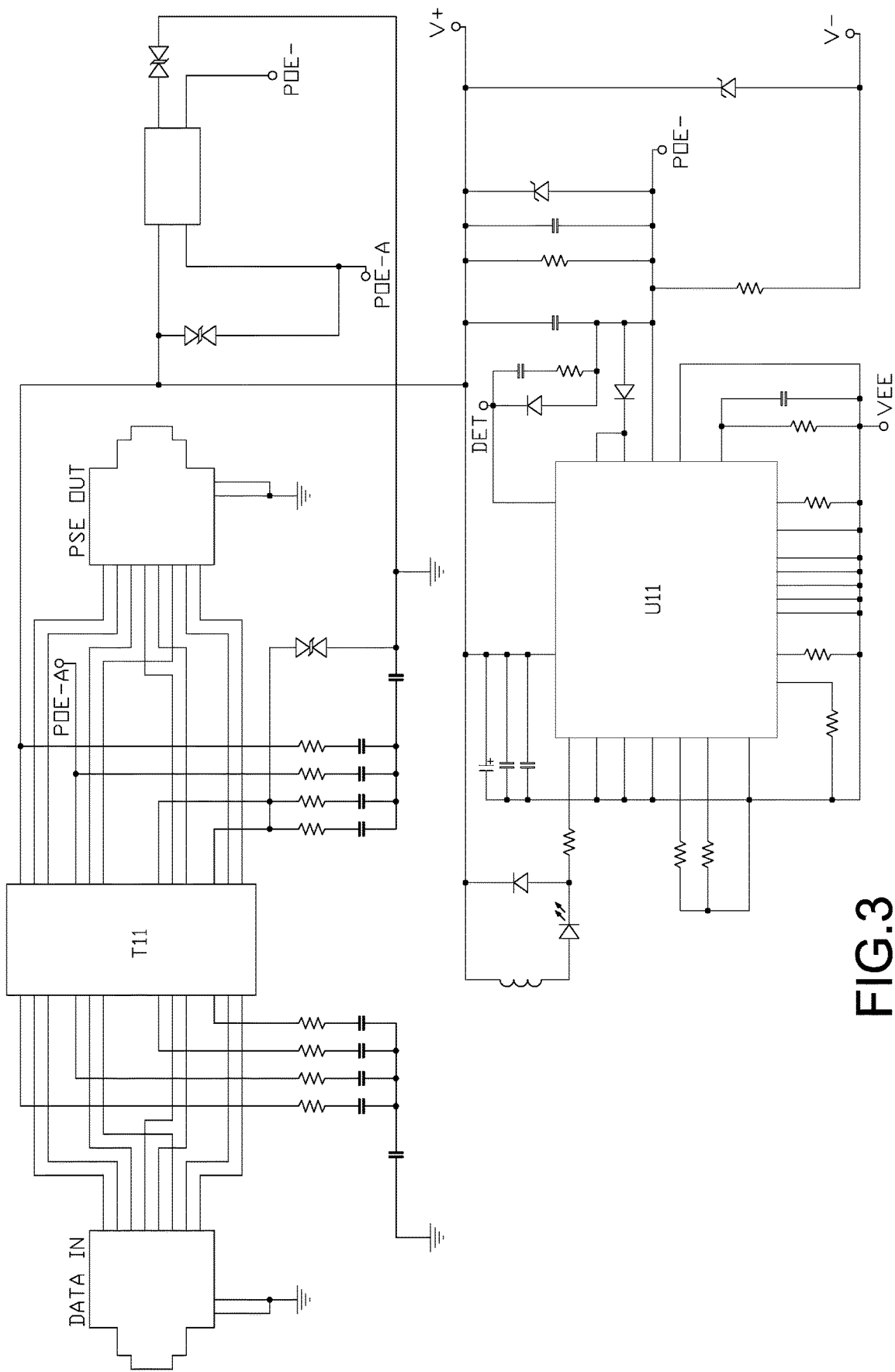
FIG. 3 is a detailed block circuit diagram of the power sourcing equipment according to the present disclosure.

Please refer to FIG. 1 and FIG. 3, which shows a schematic block diagram of a power sourcing equipment without a low-power-consumption control circuit and a detailed block circuit diagram of the power sourcing equipment according to the present disclosure, respectively. A power sourcing equipment (PSE) receives input data (DATA IN) through a RJ45 connector, and also receives an input DC power (V+,V−) outputted from a power converter for supplying power to the PSE. An input side of the PSE provides an input surge protection circuit 91 and an output side of the PSE provides an output surge protection circuit 94 for suppressing surge components in an input power source and surge components in an output power source, respectively. In addition, the PSE further includes a PSE controller 92 having a control unit U11, and the control unit U11 is a control center of the PSE for controlling operations of each unit and each circuit. Further, the PSE further includes a LAN transformer 93, and the LAN transformer 93 provides an electrical isolation between the input side and the output side of the PSE.

Figure 2:
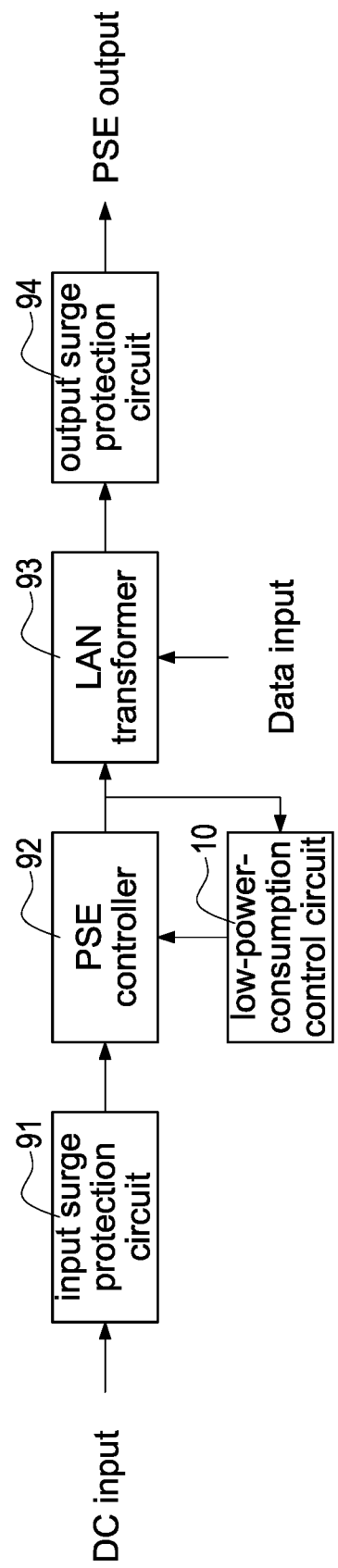
FIG. 2 is a schematic block diagram of the power sourcing equipment with the low-power-consumption control circuit according to the present disclosure.

Please refer to FIG. 2, which shows a schematic block diagram of the power sourcing equipment with the low-power-consumption control circuit according to the present disclosure. In comparison with FIG. 1, FIG. 2 further includes a low-power-consumption control circuit 10. As mentioned above, in order to solve the problem that the existing active PoE under a no-load condition fails to meet the Level VI Energy Efficiency Requirements for U.S. DoE (Department of Energy), the low-power-consumption control circuit 10 is proposed in the present disclosure. The low-power-consumption control circuit 10 is coupled to the PSE controller 92. Specifically, the low-power-consumption control circuit 10 is coupled between a contact VEE and a contact V− (shown in FIG. 3) and between a contact POE-A and a contact POE−, and is close cooperation with the PSE controller 92 to implement meeting the Level VI Energy Efficiency Requirements for U.S. DoE. The detailed operation is described as follows.

Figure 4:
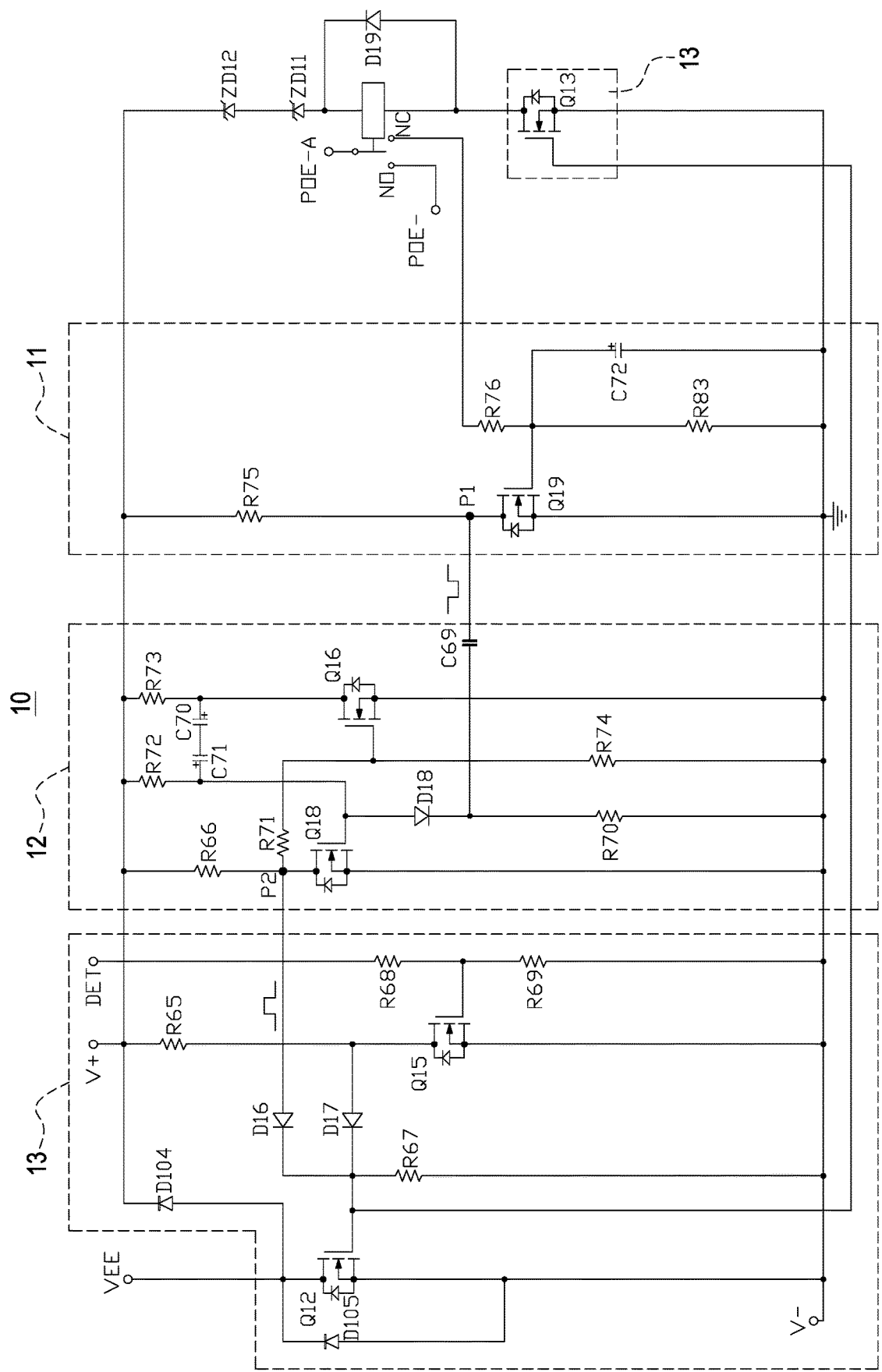
FIG. 4 is a detailed circuit diagram of the low-power-consumption control circuit according to the present disclosure.

Please refer to FIG. 4, which shows a detailed circuit diagram of the low-power-consumption control circuit according to the present disclosure. The low-power-consumption control circuit 10 is mainly divided into three parts: a detecting circuit 11, a handshaking circuit 12, and a self-holding circuit 13. When a powered device (PD) at a powered side is not connected to the PSE at a power sourcing side, the no-load mode power of the PSE is generated from power switches (for example, n-MOSFETs in this embodiment) and from vary small leakage currents flowing resistors since the contact VEE and the contact V− of the PSE are disconnected and the contact POE-A and the contact POE− are also disconnected. Therefore, the total power consumption in the no-load mode, i.e., the no-load mode power is only about 70 milliwatts, thereby meeting the Level VI Energy Efficiency Requirements for U.S. DoE, that is, the no-load mode power is less than or equal to 100 milliwatts.

When the PD is connected to the PSE, i.e., the PD is connected to a common pin of a relay, and the relay is in a normally close (NC) status, a current path is formed through a resistor R76, a resistor R83 of the detecting circuit 11, and the contact V−. At this condition, a voltage across two ends of the resistor R83 is generated and a power switch Q19 of the detecting circuit 11 is turned on by the voltage. Incidentally, if the PD is not connected to the PSE, the power switch Q19 is turned off and not affected by high impedance since the current path is not formed. In addition, since positive power supplies (positive supply voltages) in the low-power-consumption control circuit 10 is connected, negative power supplies (positive supply voltages) are provided to control circuit components, such as power switches, diodes, and so on.

When the PD is connected to the PSE, a voltage level of a voltage signal at a first contact P1 connected to a drain of the power switch Q19 is transited from a high level to a low level (i.e., a ground level) since the power switch Q19 is turned on. In other words, once the PD is connected to the PSE, the voltage level of the voltage signal at the first contact P1 outputted from the detecting circuit 11 is the low level. On the contrary, if the PD is not connected to the PSE, the voltage level of the voltage signal at the first contact P1 outputted from the detecting circuit 11 is the high level. In particular, the voltage signal at the first contact P1 is a control signal for controlling a monostable trigger when the handshaking circuit 12 performs a handshaking communication.

The handshaking circuit 12 is composed of a monostable trigger including a resistor-capacitor (RC) circuit, a power switch Q18, and a power switch Q16, and an input trigger pulse is provided to control a stable state and a metastable state of the monostable trigger. In particular, a duration time, i.e., a pulse width of the metastable state is determined by the resistor-capacitor circuit. In particular, the resistor is a resistor R72, and the capacitor is a capacitor C71 and a capacitor C70. When the voltage signal with the low level at the first contact P1 enters the handshaking circuit 12, the power switch Q18 is turned off since a diode D18 is forward-biased turned on. Therefore, the energy stored in the capacitors C71, C70 is first released and then re-generates an oscillation frequency and re-charges and re-discharges the capacitors C71, C70. Afterward, the power switch Q18 and the power switch Q16 starts operating, and the resistor R72 and the capacitors C71, C70 perform the monostable trigger operation. At this condition, a voltage level of a voltage signal at a second contact P2 connected to a drain of the power switch Q18 is transited from a low level to a high level. In particular, the duration time of the high level, i.e., the pulse width can be determined by the design of the resistor R72 and the capacitors C71, C70 according to the actual needs. Since it is a monostable trigger, only one trigger by the voltage signal with the low level at the first contact P1 and then the trigger of the monostable trigger can be completed.

Incidentally, when the voltage signal at the second contact P2 is transited from the low level to the high level, the handshaking circuit 12 starts to perform a handshaking operation (handshaking communication) between the PSE and the PD. Specifically, during the handshaking operation, the PD requests the PSE for the required power, for example, the required power is 10 watts. If the PSE can provide the sufficient power supply, for example 30 watts, the PSE may respond to agree the power requested by the PD. Therefore, the PSE receives the PD plugged (connected) to the PSE as a load thereof after the handshaking operation. On the contrary, the PD requests the PSE for the required power, for example, the required power is 50 watts. If the PSE cannot provide the sufficient power supply, for example 30 watts, the PSE may respond to disagree the power requested by the PD, or reject to response the power requested by the PD. Therefore, the PSE rejects the PD plugged (connected) to the PSE as a load thereof after the handshaking operation.

When the voltage signal at the second contact P2 outputted from the handshaking circuit 12 is high-level, a diode D16 of the self-holding circuit 13 is forward-biased turned on, thereby turning on a power switch Q12 of the self-holding circuit 13. At this condition, the contact VEE is connected to the contact V−. In addition, since a power switch Q13 of the self-holding circuit 13 is also turned on by the high-level voltage signal at the second contact P2, the relay is switched from the normally close (NC) status to a normally open (NO) status, i.e., the PD is connected to the common pin of the relay, and the relay is in the normally close (NO) status. At this condition, the contact POE-A is also connected to the contact POE−. In other words, the PD is connected to a real power supply terminal, i.e., the contact POE−, that is, the contact POE− is one of output pins of the control unit U11 of the PSE. If the PD is not connected to the PSE or the PD is removed from the PSE, the common pin and the normally close (NC) pin of the relay are connected; if the PD is connected to the PSE, the common pin and the normally close (NC) pin are disconnected.

When the power confirmation during the handshaking communication is completed and the PD is connected to the PSE, the control unit U11 (refer to FIG. 3) of the PSE provides a detection signal DET (or also referred to as "power-good signal") with a low level from a detection pin of the control unit U11. Since the detection signal DET is low-level, a power switch Q15 of the self-holding circuit 13 is turned off. At this condition, a drain of the power switch Q15 receives a high-level voltage provided from the contact V+ so that a diode D17 is forward-biased turned on. Once the diode D17 is turned on, the voltage signal at the second contact P2 is transited from the high level to a low level. Therefore, the power switch Q12 and the power switch Q13 can continuously be turned on by turning on the diode D17. In particular, a duration time of the voltage signal at the second contact P2 with the high level can be determined by coordination of controlling the diode D16 and the diode D17. That is, when the diode D17 is just turned on, the diode D16 is still turned on. For the power switch Q12 and the power switch Q13, an "OR operation" is implemented by the diode D16 and the diode D17. In other words, the meaning of the voltage signal at the second contact P2 being transited from the high level to the low level is: the handshaking communication has been completed and the turned-on diode D17 takes over the diode D16 to ensure turning on the power switch Q12 and the power switch Q13 so that the PD is supplied power by the PSE through the contact POE−. In other words, as long as the PD is connected to the PSE and is not removed again, since the contact VEE is connected to the contact V− and the contact POE-A is connected to the contact POE−, the PD can acquire the required power from the PSE to normally work.

According to the above description, it is clear that the forward-biased turned-on diode D16 (by the high-level voltage signal at the second contact P2) turning on the power switch Q12 and the power switch Q13 is temporary (transitionary). Once the handshaking communication is successful, the forward-biased turned-on diode D17 (by the low-level detection signal DET outputted from the control unit U11 of the PSE) turning on the power switch Q12 and the power switch Q13 is permanent. The meaning of the permanent turned-on diode D17 is: the handshaking communication between the PD and the PSE is successful and the PD is correctly connected to the PSE so that the control unit U11 of the PSE takes over the right of the control and operation, including suppling power to the PD, providing the low-level detection signal DET to the self-holding circuit 13 when the PD is continuously connected to the PSE, and providing the high-level detection signal DET to the self-holding circuit 13 when the PD is removed from the PSE. The above-mentioned "permanent" means that the PD is permanently connected to the PSE (without being removed from the PSE). Accordingly, it is to implement controlling the low-power-consumption control circuit 10 and transferring the right of the control and operation from the PD to the PSE.

Incidentally, if the handshaking between the PD and the PSE is unsuccessful, for example a failed connection between the PD and the PSE or the required power of the PD without being provided from the PSE to the PD, the voltage signal at the second contact P2 is transited from the high level to the low level. At this condition, the reverse-biased turned-off diode D16 turns off the power switch Q12 and the power switch Q13, and therefore the contact VEE is disconnected to the contact V− and the contact POE-A is disconnected to the contact POE−. Accordingly, the no-load power consumption of the PSE of the active PoE meets the Level VI Energy Efficiency Requirements for U.S. DoE.

When the PD completely works and is removed from the PSE, the control unit U11 of the PSE can actively detect that the PD has been removed and stop supplying power to the PD. Specifically, when the PD is connected to the PSE for working, a minimum current exists between the PD and the PSE. Hence, once the PD completely works and is removed from the PSE, the minimum current no longer exists. Accordingly, the control unit U11 of the PSE can determine that the PD is removed from the PSE according to the detection of the minimum current, thereby stopping supplying power to the PD.

At this condition, the detection signal DET provided from the detection pin of the control unit U11 of the PSE is transited from the low level to the high level. Since the detection signal DET is high-level, the power switch Q15 is turned on again so that a voltage at the drain of the power switch Q15 restores to the low level (i.e., the ground level), and therefore the diode D17 is reverse-biased turned off. Since the diode D16 has already been turned off, and the diode D17 is also turned off, the power switch Q12 and the power switch Q13 are turned off so that the contact VEE and the contact V− are disconnected and the contact POE-A and the contact POE− are also disconnected. Therefore, the PSE does not generate additional power consumption and there is no power consumption generated from the relay since the PD is not supplied power from the PSE, i.e., the no-load mode power of the PSE is generated from power switches (for example, n-MOSFETs in this embodiment) and from small leakage currents flowing resistors. Therefore, the no-load mode power is only about 70 milliwatts, thereby meeting the Level VI Energy Efficiency Requirements for U.S. DoE, that is, the no-load mode power is less than or equal to 100 milliwatts.

In particular, in order to avoid the abnormal use of plugging the PD into the PSE and then immediately removing the PD so that the PSE makes an erroneous determination that the PD has been connected to the PSE, the operation of the handshaking circuit 12 is important. By the handshaking communication between the PD and the PSE to ensure that the required power of the PD is confirmed, the PSE determines that the PD is correctly plugged into the PSE so that the PSE supplies power to the PD. Therefore, if the PD is plugged into the PSE and then immediately removed, the required power would not be correctly determined and confirmed during the handshaking communication. At this condition, the contact VEE and the contact V− are still disconnected and the contact POE-A and the contact POE− are also still disconnected to make the PSE restore to the no-load condition with the low power consumption, thereby meeting the Level VI Energy Efficiency Requirements for U.S. DoE.

In conclusion, the present disclosure has following features and advantages:

1. By disconnecting the contact VEE and the contact V− and the contact POE-A and the contact POE− under the no-load condition, i.e., the PD is not connected to the PSE, the no-load mode power is less than or equal to 100 milliwatts, thereby meeting the Level VI Energy Efficiency Requirements for U.S. DoE.

2. By using the characteristic of very small leakage current of the n-MOSFET, the PSE's power consumption under the no-load condition is extremely low.

3. By designing the monostable trigger, the handshaking communication between the PD and the PSE can be implemented.

4. By providing the detection signal DET outputted from the control unit U11 of the PSE, the operation of controlling the self-holding circuit 13 can be implemented.

5. By temporarily turning on the diode D16 and permanently turning on the diode D17, the power switch Q12 and the power switch Q13 are continuously turned on.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An active power over Ethernet control apparatus with low power consumption, comprising:
   a control unit installed inside a power sourcing equipment, and
   a low-power-consumption control circuit, comprising:
      a detecting circuit configured to provide a first control signal, and the detecting circuit comprising:
         a voltage-divided resistor network, and
         a first power switch coupled to the voltage-divided resistor network,
      a handshaking circuit coupled to the detecting circuit and configured to receive the first control signal and provide a second control signal, and
      a self-holding circuit coupled to the handshaking circuit and configured to receive the second control signal,
   wherein when a powered device is not connected to the power sourcing equipment, the first power switch is turned off to make the detecting circuit provide the first control signal with a high level, and a power-supplying path from the power sourcing equipment to the powered device is disconnected; when the powered device is initially connected to the power sourcing equipment, the voltage-divided resistor network is configured to provide a voltage at which the first power switch is turned on so that the detecting circuit provide the first control signal with a low level, and then the handshaking circuit is controlled by the first control signal and the self-holding circuit is controlled by the second control signal to make the power-supplying path be connected.

2. The active power over Ethernet control apparatus with low power consumption in claim 1, wherein the handshaking circuit comprises:
   a monostable trigger configured to receive the first control signal, comprising:
      a resistor-capacitor network, and
      a second power switch and a third power switch coupled to the resistor-capacitor network,
   wherein when the powered device is connected to the power sourcing equipment, the monostable trigger is controlled by the first control signal to make the handshaking circuit provide the second control signal with a high level.

3. The active power over Ethernet control apparatus with low power consumption in claim 2, wherein a duration time of the second control signal with the high level is determined by the resistor-capacitor network.

4. The active power over Ethernet control apparatus with low power consumption in claim 2, wherein the self-holding circuit comprises:
   a first diode,
   a second diode coupled to the first diode,
   a fourth power switch coupled to the first diode and the second diode,
   a fifth power switch coupled to the first diode and the second diode, and
   a sixth power switch coupled to the second diode,
   wherein when the powered device is connected to the power sourcing equipment, the first diode is turned on by the second control signal with the high level, and the fourth power switch, the fifth power switch, and the sixth power switch are turned on.

5. The active power over Ethernet control apparatus with low power consumption in claim 4, wherein a handshaking communication is performed between the powered device and the power sourcing equipment within the duration time of the second control signal with the high level.

6. The active power over Ethernet control apparatus with low power consumption in claim 5, wherein when the handshaking communication between the powered device and the power sourcing equipment is successful, the control unit is configured to produce a detection signal with a low level to turn off the sixth power switch and turn on the second diode, the fourth power switch, and the fifth power switch.

7. The active power over Ethernet control apparatus with low power consumption in claim 6, wherein when the powered device is disconnected to the power sourcing equipment, the control unit is configured to produce the detection signal with a high level to turn off the second diode, the fourth power switch, and the fifth power switch.

8. The active power over Ethernet control apparatus with low power consumption in claim 7, wherein each of the power switches is an n-MOSFET.

9. The active power over Ethernet control apparatus with low power consumption in claim 1, wherein an energy consumption of the power sourcing equipment in a no-load condition is less than or equal to 100 milliwatts.

\* \* \* \* \*